US007915886B2

(12) United States Patent
Stolfus et al.

(10) Patent No.: US 7,915,886 B2
(45) Date of Patent: *Mar. 29, 2011

(54) MAGNETIC SPEED, DIRECTION, AND/OR MOVEMENT EXTENT SENSOR

(75) Inventors: Joel D. Stolfus, Freeport, IL (US); Jason M. Chilcote, Frisco, TX (US)

(73) Assignee: Honeywell International Inc., Morristown, NJ (US)

( * ) Notice: Subject to any disclaimer, the term of this patent is extended or adjusted under 35 U.S.C. 154(b) by 938 days.

This patent is subject to a terminal disclaimer.

(21) Appl. No.: 11/668,131

(22) Filed: Jan. 29, 2007

(65) Prior Publication Data

US 2008/0180089 A1    Jul. 31, 2008

(51) Int. Cl.
*G01P 3/44* (2006.01)
(52) U.S. Cl. ... 324/174; 324/173; 324/165; 324/207.21; 324/252
(58) Field of Classification Search ............ 324/207.25, 324/207.21, 252, 174, 173, 165
See application file for complete search history.

(56) References Cited

U.S. PATENT DOCUMENTS

| 2006/0103381 | A1 | 5/2006 | Schmollngruber et al. |
| 2008/0180090 | A1* | 7/2008 | Stolfus et al. ............... 324/174 |

FOREIGN PATENT DOCUMENTS

WO    WO 2004/113928 A2    12/2004

OTHER PUBLICATIONS

Klaus Dietmayer et al., "Contactless Angle Measurement using KMZ41 and UZZ9000", Philips Semiconductors, Application Note AN98097, Dec. 16, 1998, pp. 1-52.
NXP founded by Philips, KMZ41 Magnetic field sensor—Product data sheet, Rev. 05—Nov. 27, 2006, pp. 1-10.
D. Wang et al., "360 Degree Angle Sensor Using Spin Valve Materials with SAF Structure", Feb. 7, 2005, pp. 1-3.
NVE Corporation—"AA and AB-Series Analog Sensors", pp. 12-27.
Dietmayer K et al., Contactless Angle Measurement, Philips Semiconductors Application Note, Jan. 2000, pp. 1-13, XP002306258.

* cited by examiner

*Primary Examiner* — Reena Aurora
(74) *Attorney, Agent, or Firm* — Ingrassia Fisher & Lorenz, P.C.

(57) ABSTRACT

A first magnetic sensor produces a first output signal in response to movement of a target such as a multi-pole ring magnet, and a second magnetic sensor produces a second output signal in response to movement of the target. The first and second magnetic sensors may be corresponding magnetoresistor sensors, the first and second magnetic sensors may be intertwined, the first and second magnetic sensors may be oriented at an angle with respect to one another so as to produce a difference in phase between the first and second output signals, the first and second magnetic sensors may be arranged so as to produce a 90° phase difference between the first and second output signals, and/or the first and second magnetic sensors may be formed on a semiconductor substrate.

39 Claims, 9 Drawing Sheets

FIG. 10 ically adjusted so that their output signals meet the specified phase shift requirements. Otherwise, errors in the phase shift will lead to a miscalculation of the speed of the target and, if the phase error is large enough to allow the output signals to cross, to a miscalculation of the direction of the movement of the target.

MAGNETIC SPEED, DIRECTION, AND/OR MOVEMENT EXTENT SENSOR

TECHNICAL FIELD

The technical field of the present disclosure relates to, inter alia, magnetic sensors such as those that are useful in the detection of the speed and/or direction of an object such as a rotating shaft.

BACKGROUND

Magnetic sensing systems are used in a wide variety of applications including, for example, determining the speed and direction of a rotating shaft. There are various methods of constructing the magnetic sensors of a magnetic sensing system. For example, a magnetic sensing system could comprise two separate magnetic sensors and a target (typically a structure having magnetic poles) that are arranged so that each of the two magnetic sensors produces an output signal as the target rotates or moves with respect to the magnetic sensors.

The two magnetic sensors may be spaced at a predetermined distance from one another so as to create a phase shift between their output signals. This phase shift can allow a designer (i) to use these output signals from the sensors to produce a higher resolution speed signal so that speed changes can be detected more quickly and (ii) to use the lead and lag information between the output signals from the two sensors in order to determine direction of rotation or movement of the target.

The phase shift between the outputs of two magnetic sensors is dependent on the spacing between the magnetic sensors and the spacing between the features of the rotating or moving target. Frequently, the target is a ring magnet with a plurality of evenly spaced magnetic poles. The magnetic sensors are usually contained in separate packages, which makes it very difficult for the magnetic sensors to be arranged in a manner so that their output signals meet specified phase shift requirements. The magnetic sensors must be very accurately manufactured and/or they must be dynamically adjusted so that their output signals meet the specified phase shift requirements. Otherwise, errors in the phase shift will lead to a miscalculation of the speed of the target and, if the phase error is large enough to allow the output signals to cross, to a miscalculation of the direction of the movement of the target.

Magnetic sensors are sometimes provided on the same integrated circuit and are spaced a certain distance apart. However, although this spacing may be good for one particular pole spacing, it will not be correct for another. One solution is to fabricate an integrated circuit for each different ring magnet. However, making a new integrated circuit for every new spacing is expensive.

The present invention overcomes one or more of these or other problems.

SUMMARY OF THE INVENTION

According to one aspect of the present invention, a movement sensor comprises a multi-pole ring magnet, a semiconductor substrate, and first and second magnetic sensors. The first magnetic sensor is formed on the semiconductor substrate, and the first magnetic sensor produces a first output signal in response to movement of the multi-pole ring magnet. The second magnetic sensor is formed on the semiconductor substrate so as to be intertwined with the first magnetic sensor and so as to be at a predetermined angle with respect to the first magnetic sensor, the second magnetic sensor produces a second output signal in response to movement of the multi-pole ring magnet, the predetermined angle is between 0° and 90° exclusive, and the predetermined angle is sufficient to produce a difference in phase between the first and second output signals.

According to another aspect of the present invention, a movement sensor comprises a multi-pole ring magnet, a semiconductor substrate, and first and second magnetic sensors. The first magnetic sensor is formed on the semiconductor substrate, and the first magnetic sensor produces a first output signal in response to movement of the multi-pole ring magnet. The second magnetic sensor is formed on the semiconductor substrate, the second magnetic sensor produces a second output signal in response to movement of the multi-pole ring magnet, and the first and second magnetic sensors are intertwined on the semiconductor substrate.

According to still another aspect of the present invention, an integrated circuit direction sensing system that determines direction of movement of a target comprises a semiconductor substrate, first and second magnetoresistor sensors, and a direction detector. The first magnetoresistor sensor is formed on the semiconductor substrate and produces a first output signal in response to movement of the target. The second magnetoresistor sensor is formed on the semiconductor substrate so as to be intertwined with the first magnetic sensor and so as to produce a second output signal in response to movement of the target, the first and second magnetoresistor sensors are angled with respect to one another at a predetermined angle so as to produce a difference in phase between the first and second output signals, and the predetermined angle is between 0° and 90° exclusive. The direction detector is responsive to the phase difference between the first and second output signals so as to distinguish between first and second directions of movement of the target.

According to a further aspect of the present invention, 32, a movement sensor comprises a multi-pole ring magnet, a semiconductor substrate, and n magnetic sensors formed on the semiconductor substrate. The n magnetic sensors produce corresponding output signals in response to movement of the multi-pole ring magnet, $n \geq 2$, and the n magnetic sensors have elements that are intertwined and that are formed every 90/n degrees.

BRIEF DESCRIPTION OF THE DRAWINGS

These and other features and advantages will become more apparent from the detailed description when taken in conjunction with the drawings in which.

DETAILED DESCRIPTION

Figure 1:
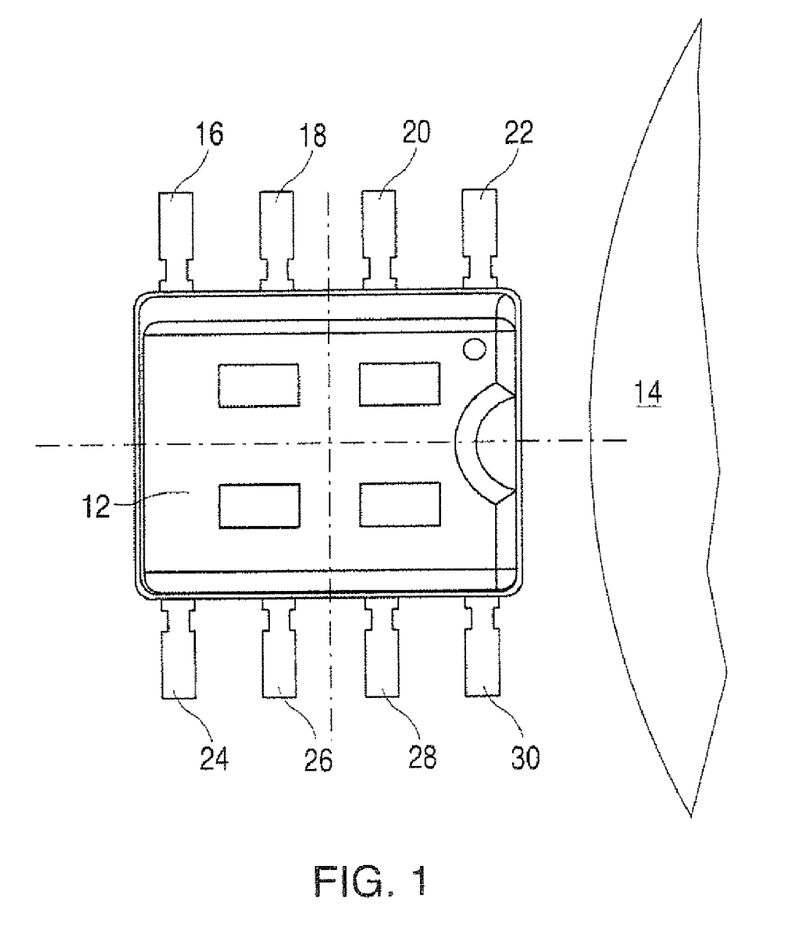
FIG. 1 illustrates a portion of a target wheel and a magnetic sensor package mounted with respect to the target wheel.

As shown in FIG. 1, a sensor package 12 is positioned in proximity to a target 14, such as a wheel, so that the magnetic sensors contained in the sensor package 12 can be used to sense movement of the target 14. As disclosed below, this movement as sensed by the magnetic sensors in the sensor package 12 can then be used, as desired, to indicate speed and/or direction of movement or rotation of the target 14.

The sensor package 12 has various connectors 16, 18, 20, 22, 24, 26, 28, and 30. For example, the connector 16 may be used as a ground connection, the connectors 20 and 26 may be used as the output of one of the magnetic sensors contained in the sensor package 12, the connectors 22 and 24 may be used as the output of the other of the magnetic sensors contained in the sensor package 12, and the connector 30 may be used for a source connection. In this configuration, the connectors 18 and 28 are not used and may be omitted as desired. Alternatively, the connectors 18 and 28 may be used for any desired purposes in other configurations.

Figure 2:
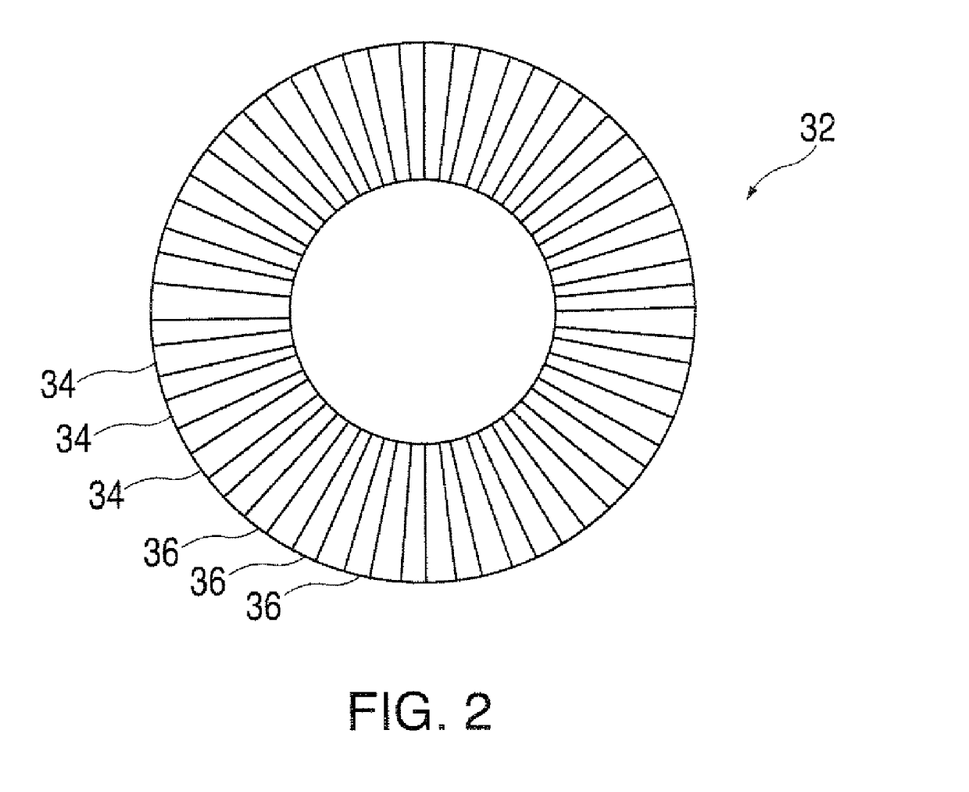
FIG. 2 illustrates an example of a target wheel that can be use for the target wheel of FIG. 1.

An example of the target 14 is shown in FIG. 2. The target 14 as illustrated in FIG. 2 is a multi-pole ring magnet 32. A first plurality of poles 34 are evenly spaced around the multi-pole ring magnet 32 and are separated by a second plurality of poles 36. The poles 34, for example, may be South poles, and the poles 36, for example, may be North poles. There will always be a south pole for every north pole and vice verse. However, other targets, such as a gear target, may be used in connection with the present invention.

Figure 3:
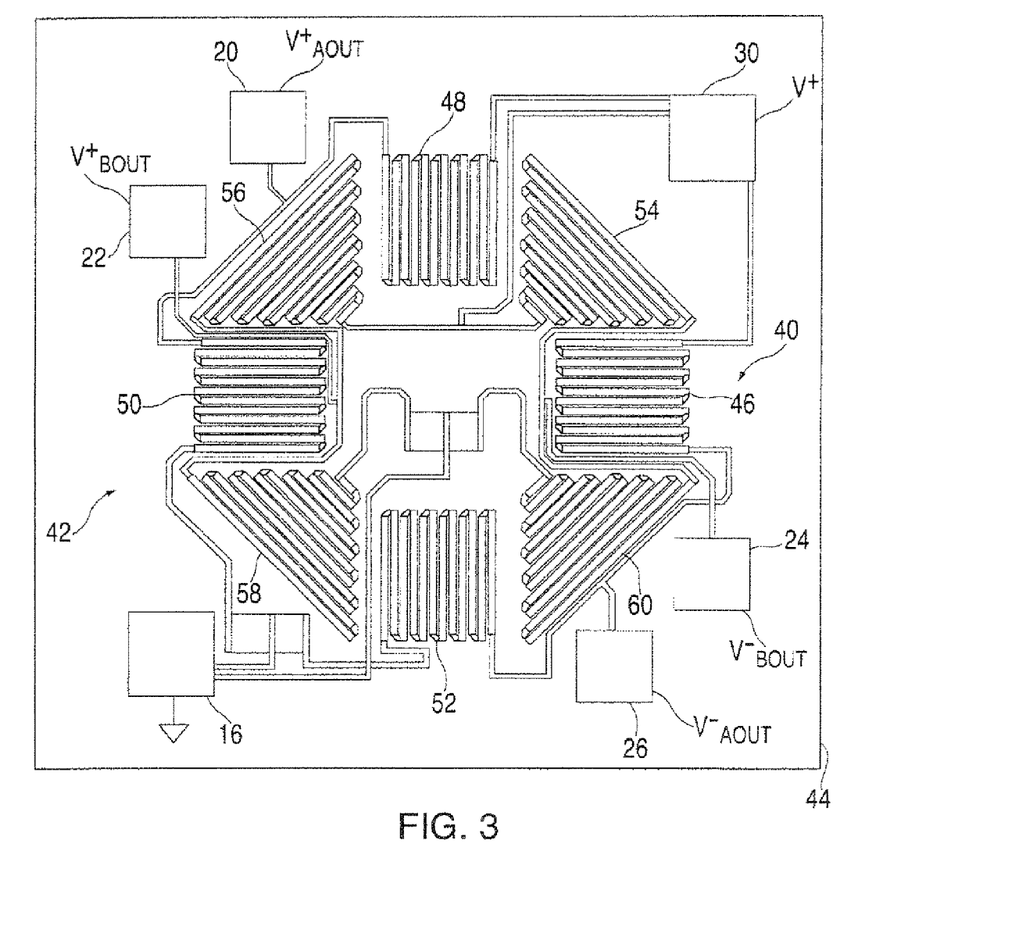
FIG. 3 illustrates an example topology of two magnetic sensors that are formed as bridges A and B and that are contained in the magnetic package of FIG. 1.

FIG. 3 shows two magnetic sensors 40 and 42 that are contained in the sensor package 12. The two magnetic sensors 40 and 42 are formed as bridges A and B, respectively, on a semiconductor substrate 44 using standard integrated circuit fabrication techniques such that the bridges A and B are topologically intertwined and are rotated by 45° with respect to one another as shown in FIG. 3.

The magnetic sensor 40 includes four magnetoresistors 46, 48, 50, and 52, and the magnetic sensor 42 includes four magnetoresistors 54, 56, 58, and 60. As shown in the drawings, the magnetic sensor 40 comprises a Wheatstone bridge, and the magnetic sensor 42 comprises a Wheatstone bridge.

Although the magnetoresistors 46, 48, 50, 52, 54, 56, 58, and 60 may be formed according to desired topology, the magnetoresistors 46, 48, 50, 52, 54, 56, 58, and 60, in the specific example shown in FIG. 3, are formed as serpentine sensors each having parallel elongated portions joined at their ends by relatively short portions to form the serpentine arrangements shown in FIG. 3.

The elongated portions of the magnetoresistor 46 are formed parallel to a first axis that is perpendicular to a second axis that is parallel to the elongated portions of the magnetoresistor 48, the second axis that is parallel to the elongated portions of the magnetoresistor 48 is perpendicular to a third axis that is parallel to the elongated portions of the magnetoresistor 50, the third axis that is parallel to the elongated portions of the magnetoresistor 50 is perpendicular to a fourth axis that is parallel to the elongated portions of the magnetoresistor 52, and the fourth axis that is parallel to elongated portions of the magnetoresistor 52 is perpendicular to the first axis that is parallel to the elongated portions of the magnetoresistor 46.

Similarly, the elongated portions of the magnetoresistor 54 are formed along a fifth axis that is perpendicular to a sixth axis that is parallel to the elongated portions of the magnetoresistor 56, the sixth axis that is parallel to the elongated portions of the magnetoresistor 56 is perpendicular to a seventh axis that is parallel to the elongated portions of the magnetoresistor 58, the seventh axis that is parallel to the elongated portions of the magnetoresistor 58 is perpendicular to an eighth axis that is parallel to the elongated portions of the magnetoresistor 60, and the eighth axis that is parallel to the elongated portions of the magnetoresistor 60 is perpendicular to fifth axis that is parallel to the elongated portions of the magnetoresistor 54.

Also, the first, second, third, and fourth axes of the magnetoresistors 54, 56, 58, and 60 make a 45° with respect to the fifth, sixth, seventh, and eighth axes of adjacent ones of the magnetoresistors 46, 48, 50, and 52.

Figure 4:
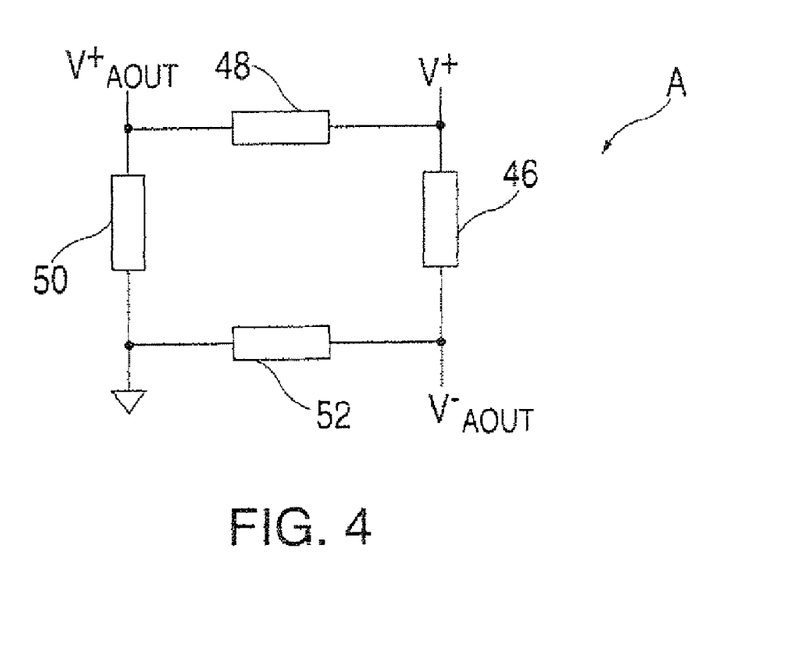
FIG. 4 illustrates the bridge A electrically.

The source (V+) connector 30 is connected to one end of the magnetoresistors 46 and 48, and the ground connector 16 is connected to one end of the magnetoresistors 50 and 52. The other ends of the magnetoresistors 48 and 50 are connected together and to the bridge A output connector 20, and the other ends of the magnetoresistors 46 and 52 are connected together and to the bridge A output connector 26. Electrically, bridge A is shown in FIG. 4.

Figure 5:
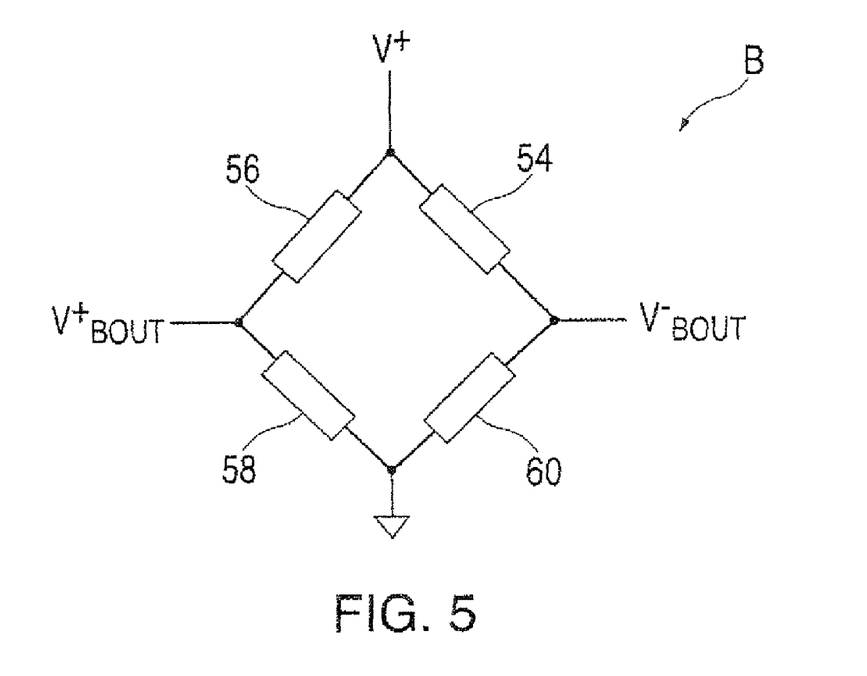
FIG. 5 illustrates the bridge B electrically.

The source (V+) connector 30 is connected to one end of the magnetoresistors 54 and 56, and the ground connector 16 is connected to one end of the magnetoresistors 58 and 60. The other ends of the magnetoresistors 56 and 58 are connected together and to the bridge B output connector 22, and the other ends of the magnetoresistors 54 and 60 are connected together and to the bridge B output connector 24. Electrically, bridge B is shown in FIG. 5.

The magnetoresistors 46, 48, 50, 52, 54, 56, 58, and 60 as formed on the semiconductor substrate 44 may be coplanar.

Figure 6:
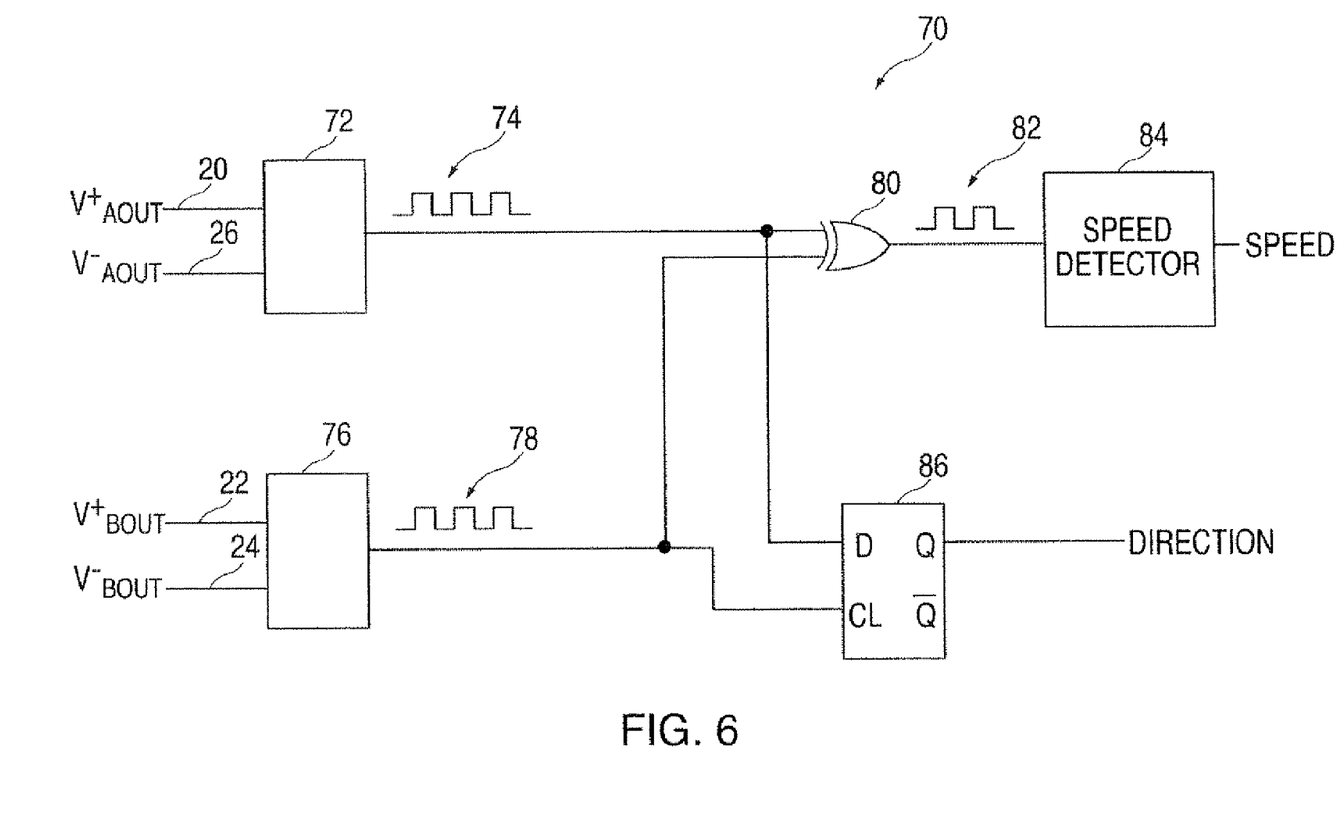
FIG. 6 illustrates an example of one circuit that processes the output signals of the two magnetic sensors of FIG. 3.

FIG. 6 illustrates an example of a circuit 70 that receives the outputs from the bridges A and B and uses these outputs to produce a speed signal and/or a direction signal that indicates the speed and/or direction of movement of the target 14. The circuit 70 includes a first signal conditioner 72 that is connected to connectors 20 and 26 in order to receive the outputs from the bridge A. The first signal conditioner 72 may include, for example, buffers, amplifiers, switches, and/or such other apparatus as are suitable for providing a square wave output signal 74 having a frequency dependent upon the speed of the target 14 and the number of poles on the target 14.

The circuit 70 further includes a second signal conditioner 76 that is connected to connectors 22 and 24 in order to receive the outputs from the bridge B. The second signal conditioner 76 may include, for example, buffers, amplifiers, switches, and/or such other apparatus as are suitable for providing a square wave output signal 78 having a frequency dependent upon the speed of the target 14 and the number of poles on the target 14.

Figure 7:
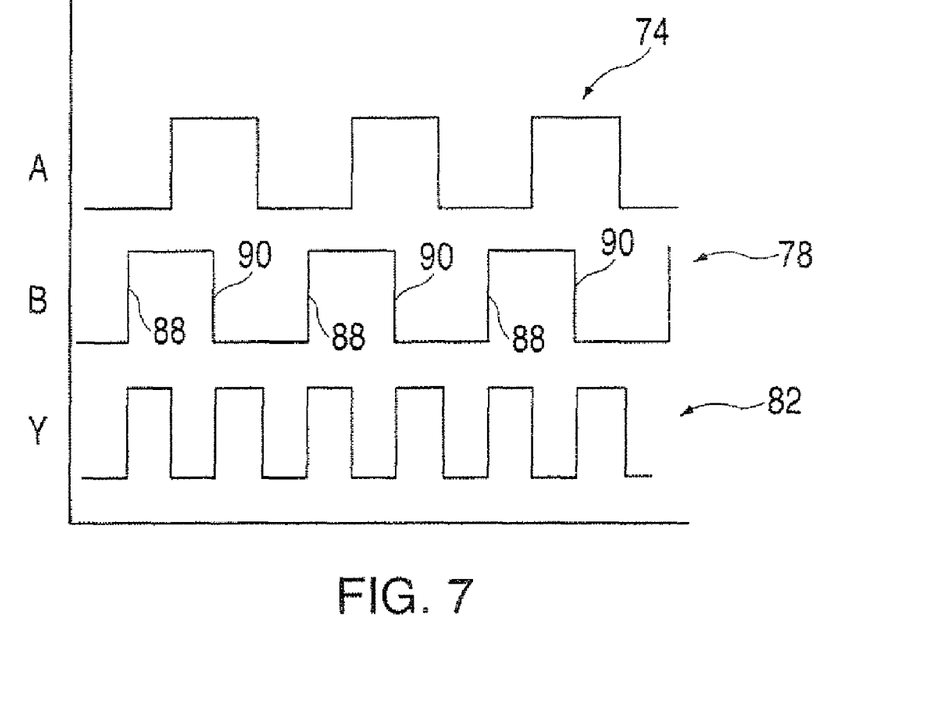
FIG. 7 illustrates example waveforms corresponding to the sensor outputs from the signal processing circuit of FIG. 6 and an optional combined output signal useful in determining speed.

Because the bridges A and B are rotated by 45° with respect to one another, the square wave output signal 74 is shifted in phase by 90° with respect to the square wave output signal 78. This phase shift is shown in FIG. 7. As can be seen from FIG. 7, because the bridges A and B are accurately rotated by 45° with respect to one another due to the inherent accuracy of integrated circuit fabrication processing, and because the two bridges A and B are intertwined so that they essentially occupy the same space on the semiconductor substrate 44, the phase is very accurately centered at 90° of phase shift. This phase shift also will be independent of the magnet pole size over the typical range of poles sizes commonly used in ring magnet sensing. Because the phase shift is set by the relative rotation of the bridges A and B during the integrated circuit fabrication process, no tight manufacturing tolerances or adjustments are required to control the phase shift.

As further shown in FIG. 6, the square wave output signals 74 and 78 are combined by an EXCLUSIVE OR 80 so as to produce a square wave output signal 82. The relationship between the square wave output signals 74, 78, and 82 is shown in FIG. 7. A speed detector 84 uses the square wave output signal 82 in order to determine the speed of the target 14 and provides a speed output indicating this speed. As can be seen from FIG. 7, the use of the EXCLUSIVE OR 80 doubles the frequency of the output signal as compared to the square wave output signal 74 or the square wave output signal 78 and, therefore, doubles the resolution of the speed indicating signal provided by the speed detector 84 based on only one of the bridges A and B.

The speed detector 84 can determine the speed of the target 14 from the square wave output signal 82 in any of a variety of ways. For example, knowing the number of pulses required for the target 14 to move through a predetermined angle, the speed detector 84 can determine the amount of the time that is required for the target 14 to move through this predetermined angle and can use this angle and time information to determine speed. Alternatively, the speed detector 84 can determine the frequency of the square wave output signal 82 and can perform a look up that correlates frequency with speed for a particular form of the target 14. As will be understood by those skilled in the art, there are many other ways for determining the speed of the target 14 from the square wave output signal 82.

Additionally or alternatively, the square wave output signals 74 and 78 can also be used to determine the direction of movement of the target 14. One manner of determining the direction of movement of the target 14 is shown in FIG. 6. In this case, the square wave output signal 74 is supplied to the D input of a D flip-flop 86, and the square wave output signal 78 is supplied to the clock input of the D flip-flop 86. The Q output will be at a high state when the target 14 is moving in one direction, and the Q output will be at a low state when the target 14 is moving in the other direction. Thus, the state of the Q output indicates the direction of movement of the target 14.

That is, when the target 14 moves in a first direction, the square wave output signals 74 and 78 enter the corresponding D and clock inputs of the D flip-flop 86 in a particular fashion, say from left to right as viewed in FIG. 7. When the square wave output signals 74 and 78 enter the D and clock inputs of the D flip-flop 86 from left to right as viewed in FIG. 7, then each rising edge 88 of the square wave output signal 78 enters the clock input of the D flip-flop when the square wave output signal 74 is low. Accordingly, the Q output of the D flip-flop 86 is at a low state, thus indicating the first direction of movement of the target 14.

However, when the target 14 moves in the second or opposite direction, the square wave output signals 74 and 78 enter the corresponding D and clock inputs of the D flip-flop 86 in the opposite fashion, say from right to left as viewed in FIG. 7. When the square wave output signals 74 and 78 enter the D and clock inputs of the D flip-flop 86 from right to left as shown in FIG. 7, then each rising edge 90 of the square wave output signal 78 enters the clock input of the D flip-flop when the square wave output signal 74 is high. Accordingly, the Q output of the D flip-flop is at a high state, thus indicating the second or opposite direction of movement of the target 14.

Each of the magnetoresistors 46, 48, 50, 52, 54, 56, 58, and 60, for example, may be a corresponding Anisotropic MagnetoResistive (AMR) sensor. Such sensors are non-polarity sensitive, so a complete magnetic signal cycle (roughly equivalent to a full sine wave) is achieved for each ring magnet pole. However, some magnetic sensors such as Hall effect sensors are polarity sensitive and need two ring magnet poles (or one pole-pair) to achieve a complete magnetic signal cycle. So double the resolution can be achieved by selecting a magnetoresistor sensor.

As described above, the two intertwined magnetic sensors 40 and 42 occupy the same area on the semiconductor substrate 44 and may be fabricated on the semiconductor substrate 44 using standard integrated circuit fabrication techniques. Bridges A and B formed by the magnetic sensors 40 and 42 are rotated 45° with respect to one another such that one bridge signal is naturally shifted 90° degrees out of phase with respect to other bridge signal. This arrangement produces four times the resolution of a typical Hall effect sensor and twice the resolution of a single magnetoresistor sensor.

Another advantage of the dual intertwined sensor shown herein is that the phase is very accurately centered on 90° of phase shift because the magnetoresistor bridges A and B occupy the same space on the semiconductor substrate 44 and are very accurately rotated with respect to one another due to the inherent accuracy of the integrated circuit fabrication process.

Also, still another advantage of the sensor package 12 is that the sensor package 12 requires no modification if it is used with different multi-pole ring magnets having different numbers of poles and/or pole sizes. Thus, the phase shift between the two bridge signals 74 and 78 is independent of the magnet pole size over the typical range of pole sizes commonly used in ring magnet sensing. Because the phase shift is set by the rotational orientation of the bridges A and B in the integrated circuit wafer process, no tight manufacturing tolerances and/or adjustments are needed to control the phase shift.

Figure 8:
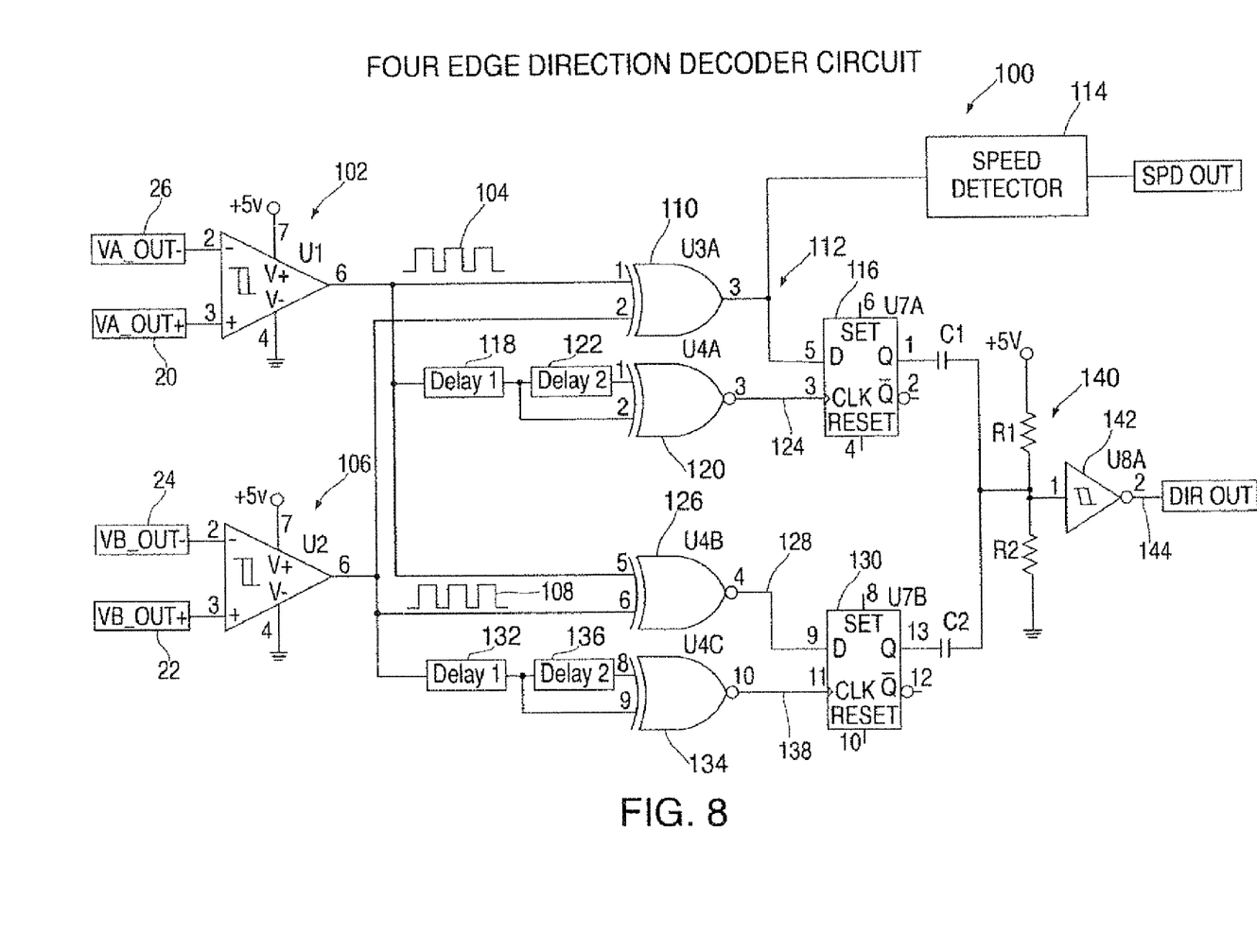
FIG. 8 illustrates example of an alternative circuit that processes the output signals of the two magnetic sensors of FIG. 3.

FIG. 8 illustrates an example of an alternative circuit 100 that receives the outputs from the bridges A and B and uses these outputs to produce a speed signal and/or a direction signal that indicates the speed and/or direction of movement of the target 14.

The circuit 100 includes a first signal conditioner 102 that is connected to connectors 20 and 26 in order to receive the outputs from the bridge A. The first signal conditioner 102 may include, for example, buffers, amplifiers, switches, and/or such other apparatus as are suitable for providing a square wave output signal 104 having a frequency dependent upon the speed of the target 14 and the number of poles on the target 14.

The circuit 100 further includes a second signal conditioner 106 that is connected to connectors 22 and 24 in order to receive the outputs from the bridge B. The second signal conditioner 106 may similarly include, for example, buffers, amplifiers, switches, and/or such other apparatus as are suitable for providing a square wave output signal 108 having a frequency dependent upon the speed of the target 14 and the number of poles on the target 14.

Figure 9:
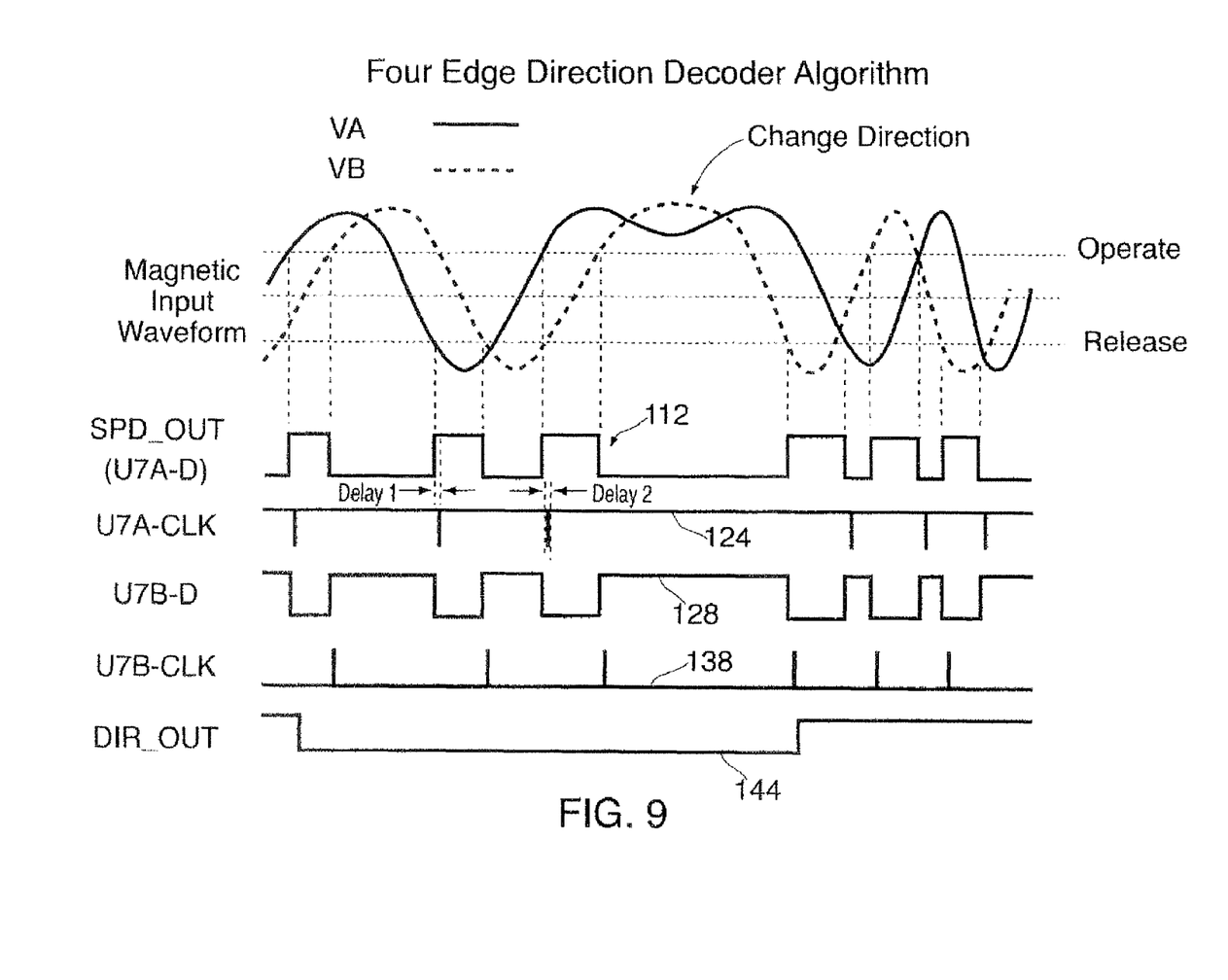
FIG. 9 illustrates example waveforms corresponding to the sensor outputs from the signal processing circuit of FIG. 8 and an optional combined output signal useful in determining speed; and, FIG. 10 illustrates an example of a linear target that can be use in place of the target wheel of FIG. 1.

Because the bridges A and B are rotated by 45° with respect to one another, the square wave output signal 104 is shifted in phase by 90° with respect to the square wave output signal 108. This phase shift corresponds to the phase shift between the bridges A and B output magnetic waveforms as shown at the top of FIG. 9. As can be seen from FIG. 9, because the bridges A and B are accurately rotated by 45° with respect to one another due to the inherent accuracy of integrated circuit fabrication processing, and because the two bridges A and B are intertwined so that they essentially occupy the same space on the semiconductor substrate 44, the phase is very accurately centered at 90° of phase shift. This phase shift also will be independent of the magnet pole size over the typical range of poles sizes commonly used in ring magnet sensing. Because the phase shift is set by the relative rotation of the bridges A and B during the integrated circuit fabrication process, no tight manufacturing tolerances or adjustments are required to control the phase shift.

As further shown in FIG. 8, the square wave output signals 104 and 108 are combined by an EXCLUSIVE OR 110 so as to produce a square wave output signal 112 shown in FIG. 9. A speed detector 114 uses the square wave output signal 112 in order to determine the speed of the target 14 and provides a speed output indicating this speed. The speed detector 114 can determine the speed of the target 14 from the square wave output signal 112 in a manner similar to that used by the speed detector 84 of FIG. 6.

Additionally or alternatively, the square wave output signals 104 and 108 can also be used to determine the direction of movement of the target 14. In this case, the square wave output signal 112 is supplied to the D input of a D flip-flop 116. The square wave output signal 104 is also supplied to a delay 118, and the output of the delay 118 is connected directly to a first input of an EXCLUSIVE NOR 120 and indirectly through a delay 122 to a second input of the EXCLUSIVE NOR 120. The output of the EXCLUSIVE NOR 120 is provided as a signal 124 shown in FIG. 9 to the clock input of the D flip-flop 116.

The delay imposed by the delay 118 provides the necessary setup time (D to be settled before clock edge arrives) for the D flip-flop 116. The delay imposed by the delay 122 provides the minimum clock width for the D flip-flop 116.

The square wave output signals 104 and 108 are also combined by an EXCLUSIVE NOR 126 so as to produce a square wave output signal 128 shown in FIG. 9. The square wave output signal 128 is supplied to the D input of a D flip-flop 130. The square wave output signal 108 is also supplied to a delay 132, and the output of the delay 132 is connected directly to a first input of an EXCLUSIVE NOR 134 and indirectly through a delay 136 to a second input of the EXCLUSIVE NOR 134. The output of the EXCLUSIVE NOR 134 is provided as a signal 138 shown in FIG. 9 to the clock input of the D flip-flop 130.

The delay imposed by the delay 132 provides the necessary setup time (D to be settled before clock edge arrives) for the D flip-flop 130. The delay imposed by the delay 136 provides the minimum clock width for the D flip-flop 130.

The Q outputs of the D flip-flops 116 and 130 are capacitively OR's by a circuit 140 and the resulting pulse is inverted and held by an inverter 142 to provide a direction signal 144 shown in FIG. 9. The direction signal 144 is at a high state when the target 14 is moving in one direction, and the direction signal 144 is at a low state when the target 14 is moving in the other direction. The resistor and capacitor values in the circuit 140 are chosen to set the voltage midway between the hysteresis band (internal to the inverter 144 in this example). These resistor and capacitor values also set the minimum time that an additional direction change will be detected.

Circuits other than the circuits 70 and 100 can be used depending upon the specific application.

Figure 10:
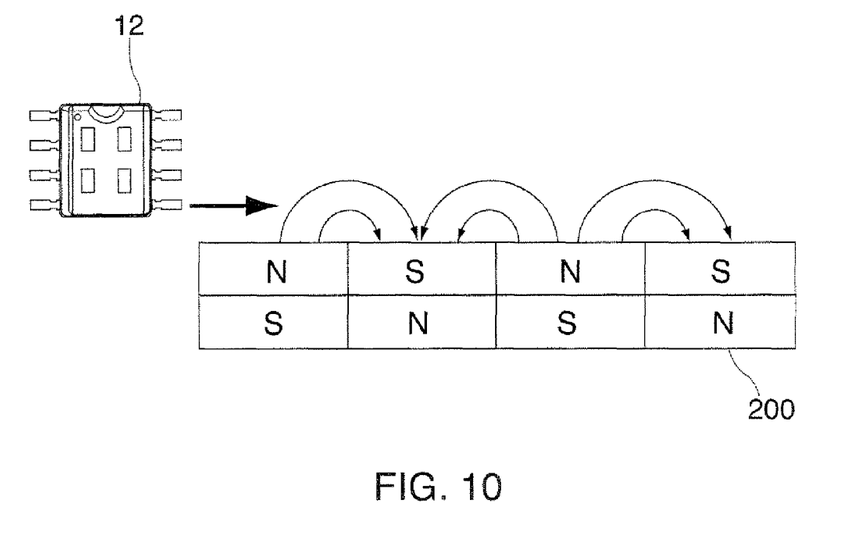

Instead of using the multi-pole ring magnet 32 of FIG. 2, other multi-pole magnets such as a linear multi-pole magnet 200 shown in FIG. 10 could be used with the sensor package 12 to detect movement extent, rate, and/or direction. For example, the circuits shown in FIGS. 6 and 8 could be used in connection with the linear multi-pole magnet 200.

Certain modifications of the present invention have been discussed above. Other modifications of the present invention will occur to those practicing in the art of the present invention. For example, the D flip-flop 86 is used to determine direction of movement of the target 14. However, other mechanisms can be used to determine direction of movement of the target 14.

Also, the magnetic sensor 40 is generally shown in the drawings and described above as a Wheatstone bridge comprising four sensing elements, and the magnetic sensor 42 is also generally shown in the drawings and described above as a Wheatstone bridge comprising four sensing elements. However, the magnetic sensors 40 and 42 may have other arrangements. For example, the magnetic sensor 40 may be a two element bridge comprising two sensing elements, and the magnetic sensor 42 may likewise be a two element bridge comprising two sensing elements.

Moreover, as described above, each of the magnetoresistors 46, 48, 50, 52, 54, 56, 58, and 60 may be a corresponding Anisotropic MagnetoResistive (AMR) sensor. However, other magnetoresistive elements may be used for the magnetoresistors 46, 48, 50, 52, 54, 56, 58, and 60. For example, a corresponding GMR element may be used for each of the magnetoresistors 46, 48, 50, 52, 54, 56, 58, and 60.

In addition, one, two, or more sensors can be integrated on the semiconductor substrate 44. Indeed, in general, n sensors can be provided such that the elements (magnetoresistors) would occur every 90/n degrees. For one bridge having a total of four elements, the elements would be formed on the semiconductor substrate 44 every 90 (90/1, n=1) degrees. For two bridges having a total of eight elements, the elements would be formed on the substrate every 45 (90/2, n=2) degrees as in FIG. 3. For three bridges having a total of twelve elements, the elements would be formed on the substrate every 30 (90/3, n=3) degrees, and so on. Using two bridges instead of one, both direction information and increased resolution are gained. After two bridges, however, only increased resolution is gained.

Furthermore, the circuit 70 may be fabricated as an integrated circuit on the semiconductor substrate 44, or may be fabricated as an integrated circuit on a substrate that is separate from the semiconductor substrate 44, or may be fabricated as a discrete element circuit.

The sensors as described here are used to detect speed and direction of a target. They can also be used to detect the extent of movement of the target.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A movement sensor comprising:
   a multi-pole magnet;
   a semiconductor substrate;
   a first magnetic sensor formed on the semiconductor substrate, wherein the first magnetic sensor produces a first output signal in response to movement of the multi-pole magnet;
   a second magnetic sensor formed on the semiconductor substrate so as to be intertwined with the first magnetic sensor and so as to be at a predetermined angle with respect to the first magnetic sensor, wherein the second magnetic sensor produces a second output signal in response to movement of the multi-pole magnet, wherein the predetermined angle is between 0° and 90° exclusive, and wherein the predetermined angle is sufficient to produce a difference in phase between the first and second output signals.

2. The movement sensor of claim 1 wherein the first magnetic sensor comprises a first magnetoresistive sensor, and wherein the second magnetic sensor comprises a second magnetoresistive sensor.

3. The movement sensor of claim 1 wherein the first magnetic sensor comprises first and second magnetic sensing elements connected so as to form a first bridge producing the first output signal in response to movement of the multi-pole magnet, and wherein the second magnetic sensor comprises third and fourth magnetic sensing elements connected so as to form a second bridge producing the second output signal in response to movement of the multi-pole magnet.

4. The movement sensor of claim 1 wherein the first magnetic sensor comprises first, second, third, and fourth magnetic sensing elements connected so as to form a first Wheatstone bridge producing the first output signal in response to movement of the multi-pole magnet, and wherein the second magnetic sensor comprises fifth, sixth, seventh, and eighth magnetic sensing elements connected so as to form a second Wheatstone bridge producing the second output signal in response to movement of the multi-pole magnet.

5. The movement sensor of claim 1 wherein the first magnetic sensor comprises first and second magnetoresistors connected so as to form a first bridge producing the first output signal in response to movement of the multi-pole magnet, and wherein the second magnetic sensor comprises third and fourth magnetoresistors connected so as to form a second bridge producing the second output signal in response to movement of the multi-pole magnet.

6. The movement sensor of claim 1 wherein the first magnetic sensor comprises first, second, third, and fourth magnetoresistors connected so as to form a first Wheatstone bridge producing the first output signal in response to movement of the multi-pole magnet, and wherein the second magnetic sensor comprises fifth, sixth, seventh, and eighth magnetoresistors connected so as to form a second Wheatstone bridge producing the second output signal in response to movement of the multi-pole magnet.

7. The movement sensor of claim 1 wherein the first magnetic sensor comprises:
a first magnetoresistor formed as a first serpentine sensor having long first portions interconnected by relatively shorter first portions;
a second magnetoresistor formed as a second serpentine sensor having long second portions interconnected by relatively shorter second portions;
a third magnetoresistor formed as a third serpentine sensor having long third portions interconnected by relatively shorter third portions; and,
a fourth magnetoresistor formed as a fourth serpentine sensor having long fourth portions interconnected by relatively shorter fourth portions;
wherein the long first and third portions are parallel to one another, wherein the long second and fourth portions are parallel to one another, and wherein imaginary axes parallel to the long first and third portions are perpendicular to imaginary axes parallel to the long second and fourth portions; and, wherein the second magnetic sensor comprises:
a fifth magnetoresistor formed as a fifth serpentine sensor having long fifth portions interconnected by relatively shorter fifth portions;
a sixth magnetoresistor formed as a sixth serpentine sensor having long sixth portions interconnected by relatively shorter sixth portions;
a seventh magnetoresistor formed as a seventh serpentine sensor having long seventh portions interconnected by relatively shorter seventh portions; and,
an eighth magnetoresistor formed as an eighth serpentine sensor having long eighth portions interconnected by relatively shorter eighth portions;
wherein the long fifth and seventh portions are parallel to one another, wherein the long sixth and eighth portions are parallel to one another, wherein imaginary axes parallel to the long fifth and seventh portions are perpendicular to imaginary axes parallel to the long sixth and eighth portions, wherein the imaginary axis parallel to the long fifth portions is at a 45° angle with respect to the imaginary axes parallel to the long first and second portions, wherein the imaginary axis parallel to the long sixth portions is at a 45° angle with respect to the imaginary axes parallel to the long second and third portions, wherein the imaginary axis parallel to the long seventh portions is at a 45° angle with respect to the imaginary axes parallel to the long third and fourth portions, wherein the imaginary axis parallel to the long eighth portions is at a 45° angle with respect to the imaginary axes parallel to the long first and fourth portions, wherein the fifth serpentine sensor is topologically between the first and second serpentine sensors, wherein the sixth serpentine sensor is topologically between the second and third serpentine sensors, wherein the seventh serpentine sensor is topologically between the third and fourth second serpentine sensors, and wherein the eighth serpentine sensor is topologically between the first and fourth serpentine sensors.

8. The movement sensor of claim 7 wherein the first, second, third, fourth, fifth, sixth, seventh, and eighth magnetoresistors are coplanar.

9. The movement sensor of claim 1 wherein the predetermined angle comprises a 45° angle.

10. The movement sensor of claim 1 wherein the predetermined angle comprises an angle to produce a 90° difference between the first and second output signals.

11. The movement sensor of claim 1 wherein the multi-pole magnet comprises a multi-pole ring magnet.

12. The movement sensor of claim 1 wherein the multi-pole magnet comprises a linear magnet having more than two poles.

13. A movement sensor comprising:
a multi-pole magnet;
a semiconductor substrate;
a first magnetic sensor formed on the semiconductor substrate, wherein the first magnetic sensor produces a first output signal in response to movement of the multi-pole magnet;
a second magnetic sensor formed on the semiconductor substrate, wherein the second magnetic sensor produces a second output signal in response to movement of the multi-pole magnet, and wherein the first and second magnetic sensors are intertwined on the semiconductor substrate.

14. The movement sensor of claim 13 wherein first and second magnetic sensors are arranged on the semiconductor substrate so as to produce a 90° phase difference between the first and second output signals.

15. The movement sensor of claim 13 wherein the second magnetic sensor is formed on the semiconductor substrate at a predetermined angle with respect to the first magnetic sensor so as to produce the 90° phase shift between the first and second output signals.

16. The movement sensor of claim 13 wherein the first magnetic sensor comprises a first magnetoresistive sensor, and wherein the second magnetic sensor comprises a second magnetoresistive sensor.

17. The movement sensor of claim 13 wherein the first magnetic sensor comprises first and second magnetic sensing elements connected so as to form a first bridge producing the first output signal in response to movement of the multi-pole magnet, and wherein the second magnetic sensor comprises third and fourth magnetic sensing elements connected so as to form a second bridge producing the second output signal in response to movement of the multi-pole magnet.

18. The movement sensor of claim 13 wherein the first magnetic sensor comprises first, second, third, and fourth magnetic sensing elements connected so as to form a first Wheatstone bridge producing the first output signal in response to movement of the multi-pole magnet, and wherein the second magnetic sensor comprises fifth, sixth, seventh, and eighth magnetic sensing elements connected so as to form a second Wheatstone bridge producing the second output signal in response to movement of the multi-pole magnet.

19. The movement sensor of claim 13 wherein the first magnetic sensor comprises first and second magnetoresistors connected so as to form a first bridge producing the first output signal in response to movement of the multi-pole magnet, and wherein the second magnetic sensor comprises third and fourth magnetoresistors connected so as to form a second bridge producing the second output signal in response to movement of the multi-pole magnet.

20. The movement sensor of claim 13 wherein the first magnetic sensor comprises first, second, third, and fourth magnetoresistors connected so as to form a first Wheatstone bridge producing the first output signal in response to movement of the multi-pole magnet, and wherein the second magnetic sensor comprises fifth, sixth, seventh, and eighth magnetoresistors connected so as to form a second Wheatstone bridge producing the second output signal in response to movement of the multi-pole magnet.

21. The movement sensor of claim 13 wherein the first magnetic sensor comprises:
a first magnetoresistor formed as a first serpentine sensor having long first portions interconnected by relatively shorter first portions;
a second magnetoresistor formed as a second serpentine sensor having long second portions interconnected by relatively shorter second portions;
a third magnetoresistor formed as a third serpentine sensor having long third portions interconnected by relatively shorter third portions; and,
a fourth magnetoresistor formed as a fourth serpentine sensor having long fourth portions interconnected by relatively shorter fourth portions;
wherein the long first and third portions are parallel to one another, wherein the long second and fourth portions are parallel to one another, and wherein imaginary axes parallel to the long first and third portions are perpendicular to imaginary axes parallel to the long second and fourth portions; and, wherein the second magnetic sensor comprises:
a fifth magnetoresistor formed as a fifth serpentine sensor having long fifth portions interconnected by relatively shorter fifth portions;
a sixth magnetoresistor formed as a sixth serpentine sensor having long sixth portions interconnected by relatively shorter sixth portions;
a seventh magnetoresistor formed as a seventh serpentine sensor having long seventh portions interconnected by relatively shorter seventh portions; and,
an eighth magnetoresistor formed as an eighth serpentine sensor having long eighth portions interconnected by relatively shorter eighth portions;
wherein the long fifth and seventh portions are parallel to one another, wherein the long sixth and eighth portions are parallel to one another, wherein imaginary axes parallel to the long fifth and seventh portions are perpendicular to imaginary axes parallel to the long sixth and eighth portions, wherein the imaginary axis parallel to the long fifth portions is at a 45° angle with respect to the imaginary axes parallel to the long first and second portions, wherein the imaginary axis parallel to the long sixth portions is at a 45° angle with respect to the imaginary axes parallel to the long second and third portions, wherein the imaginary axis parallel to the long seventh portions is at a 45° angle with respect to the imaginary axes parallel to the long third and fourth portions, wherein the imaginary axis parallel to the long eighth portions is at a 45° angle with respect to the imaginary axes parallel to the long first and fourth portions, wherein the fifth serpentine sensor is topologically between the first and second serpentine sensors, wherein the sixth serpentine sensor is topologically between the second and third serpentine sensors, wherein the seventh serpentine sensor is topologically between the third and fourth second serpentine sensors, and wherein the eighth serpentine sensor is topologically between the first and fourth serpentine sensors.

22. The movement sensor of claim 21 wherein the first, second, third, fourth, fifth, sixth, seventh, and eighth magnetoresistors are coplanar.

23. The movement sensor of claim 13 wherein the second magnetic sensor is formed on the semiconductor substrate at a 45° angle with respect to the first magnetic sensor.

24. The movement sensor of claim 13 wherein the multi-pole magnet comprises a multi-pole ring magnet.

25. The movement sensor of claim 13 wherein the multi-pole magnet comprises a linear magnet having more than two poles.

26. An integrated circuit direction sensing system that determines direction of movement of a target comprising:
a semiconductor substrate;
a first magnetoresistor sensor formed on the semiconductor substrate and arranged to produce a first output signal in response to movement of the target;
a second magnetoresistor sensor formed on the semiconductor substrate so as to be intertwined with the first magnetic sensor and so as to produce a second output signal in response to movement of the target, wherein the first and second magnetoresistor sensors are angled with respect to one another at a predetermined angle so as to produce a difference in phase between the first and second output signals, and wherein the predetermined angle is between 0° and 90° exclusive; and, a direction detector responsive to the phase difference between the first and second output signals so as to distinguish between first and second directions of movement of the target.

27. The integrated circuit direction sensing system of claim 26 wherein the phase difference between the first and second output signals comprises a 90° phase difference between the first and second output signals.

28. The integrated circuit direction sensing system of claim 26 wherein the first and second magnetoresistor sensors are oriented at a 45° angle with respect to one another.

29. The integrated circuit direction sensing system of claim 26 wherein the first magnetoresistor sensor comprises first and second magnetoresistors connected so as to form a first bridge producing the first output signal in response to movement of the target, and wherein the second magnetoresistor sensor comprises third and fourth magnetoresistors connected so as to form a second bridge producing the second output signal in response to movement of the target.

30. The integrated circuit direction sensing system of claim 26 wherein the first magnetoresistor sensor comprises first, second, third, and fourth magnetoresistors connected so as to form a first Wheatstone bridge producing the first output signal in response to movement of the target, and wherein the second magnetoresistor sensor comprises fifth, sixth, seventh, and eighth magnetoresistors connected so as to form a second Wheatstone bridge producing the second output signal in response to movement of the target.

31. The integrated circuit direction sensing system of claim 26 wherein the first magnetoresistor sensor comprises:
a first magnetoresistor formed as a first serpentine sensor having long first portions interconnected by relatively shorter first portions;
a second magnetoresistor formed as a second serpentine sensor having long second portions interconnected by relatively shorter second portions;
a third magnetoresistor formed as a third serpentine sensor having long third portions interconnected by relatively shorter third portions; and,
a fourth magnetoresistor formed as a fourth serpentine sensor having long fourth portions interconnected by relatively shorter fourth portions;
wherein the long first and third portions are parallel to one another, wherein the long second and fourth portions are parallel to one another, and wherein imaginary axes parallel to the long first and third portions are perpendicular to imaginary axes parallel to the long second and fourth portions; and,
wherein the second magnetoresistor sensor comprises:
a fifth magnetoresistor formed as a fifth serpentine sensor having long fifth portions interconnected by relatively shorter fifth portions;
a sixth magnetoresistor formed as a sixth serpentine sensor having long sixth portions interconnected by relatively shorter sixth portions;
a seventh magnetoresistor formed as a seventh serpentine sensor having long seventh portions interconnected by relatively shorter seventh portions; and,
an eighth magnetoresistor formed as an eighth serpentine sensor having long eighth portions interconnected by relatively shorter eighth portions;
wherein the long fifth and seventh portions are parallel to one another, wherein the long sixth and eighth portions are parallel to one another, wherein imaginary axes parallel to the long fifth and seventh portions are perpendicular to imaginary axes parallel to the long sixth and eighth portions, wherein the imaginary axis parallel to the long fifth portions is at a 45° angle with respect to the imaginary axes parallel to the long first and second portions, wherein the imaginary axis parallel to the long sixth portions is at a 45° angle with respect to the imaginary axes parallel to the long second and third portions, wherein the imaginary axis parallel to the long seventh portions is at a 45° angle with respect to the imaginary axes parallel to the long third and fourth portions, wherein the imaginary axis parallel to the long eighth portions is at a 45° angle with respect to the imaginary axes parallel to the long first and fourth portions, wherein the fifth serpentine sensor is topologically between the first and second serpentine sensors, wherein the sixth serpentine sensor is topologically between the second and third serpentine sensors, wherein the seventh serpentine sensor is topologically between the third and fourth second serpentine sensors, and wherein the eighth serpentine sensor is topologically between the first and fourth serpentine sensors.

32. The integrated circuit direction sensing system of claim 26 wherein the first and second magnetoresistor sensors are formed on a semiconductor substrate as an integrated circuit.

33. The integrated circuit direction sensing system of claim 32 wherein the first and second magnetoresistor sensors are coplanar.

34. The integrated circuit direction sensing system of claim 26 further comprising a speed detector responsive to the first and second output signals so as to determine the speed of the target.

35. The integrated circuit direction sensing system of claim 26 wherein the target comprises a multi-pole ring magnet.

36. The integrated circuit direction sensing system of claim 26 wherein the target comprises a linear magnet having more than two poles.

37. A movement sensor comprising:
a multi-pole magnet;
a semiconductor substrate; and,
n magnetic sensors formed on the semiconductor substrate, wherein the n magnetic sensors produce corresponding output signals in response to movement of the multi-pole magnet, wherein $n \geq 2$, wherein the n magnetic sensors have elements that are intertwined and that are formed every 90/n degrees.

38. The movement sensor of claim 37 wherein the multi-pole magnet comprises a multi-pole ring magnet.

39. The movement sensor of claim 37 wherein the multi-pole magnet comprises a linear magnet having more than two poles.

* * * * *